United States Patent
Rao et al.

(10) Patent No.: US 12,450,802 B1
(45) Date of Patent: Oct. 21, 2025

(54) WHITEBOARD CONTENT GENERATION USING LANGUAGE PROCESSING MODELS

(71) Applicant: Zoom Communications, Inc., San Jose, CA (US)

(72) Inventors: Vijay Jayaram Rao, Sunnyvale, CA (US); David Patrick Vronay, Danville, CA (US)

(73) Assignee: Zoom Communications, Inc., San Jose, CA (US)

( * ) Notice: Subject to any disclaimer, the term of this patent is extended or adjusted under 35 U.S.C. 154(b) by 160 days.

(21) Appl. No.: 18/465,565

(22) Filed: Sep. 12, 2023

(51) Int. Cl.
| | |
|---|---|
| G06F 17/00 | (2019.01) |
| G06F 40/169 | (2020.01) |
| G06F 40/186 | (2020.01) |
| G06F 40/30 | (2020.01) |
| G06T 11/60 | (2006.01) |

(52) U.S. Cl.
CPC ........... *G06T 11/60* (2013.01); *G06F 40/169* (2020.01); *G06F 40/186* (2020.01); *G06F 40/30* (2020.01)

(58) Field of Classification Search
CPC ...... G06T 11/60; G06F 40/169; G06F 40/186; G06F 40/30
See application file for complete search history.

(56) References Cited

U.S. PATENT DOCUMENTS

| | | | | |
|---|---|---|---|---|
| 9,558,467 B1 * | 1/2017 | Simon | ................... | G06Q 10/067 |
| 10,642,478 B2 * | 5/2020 | Snyder | ................... | G06F 40/171 |
| 10,691,429 B2 * | 6/2020 | Ananthapur Bache | ... | G06F 8/38 |
| 10,782,844 B2 * | 9/2020 | Farouki | ................ | G06F 3/03545 |
| 11,030,445 B2 * | 6/2021 | Yu | ............................ | G06F 40/30 |
| 11,249,627 B2 * | 2/2022 | Mondri | ................ | G06Q 10/101 |
| 11,704,009 B2 * | 7/2023 | Blume | ................. | G06V 10/764 |
| | | | | 715/722 |
| 2007/0126755 A1 * | 6/2007 | Zhang | ................... | G06F 16/739 |
| | | | | 345/619 |

(Continued)

FOREIGN PATENT DOCUMENTS

| | | | | |
|---|---|---|---|---|
| WO | WO-2014200715 A1 * | 12/2014 | ........... | G06F 3/0481 |
| WO | WO-2015095343 A1 * | 6/2015 | ........... | G06F 19/322 |

(Continued)

OTHER PUBLICATIONS

Chen, Qi, et al, "An E-whiteboard Application to Support Early Design-Stage Sketching of UML Diagrams", Department of Computer Science, University of Auckland, DOI: 10.1109/HCC.2003. 1260232, Oct. 31, 2003, pp. 219-226. (Year: 2003).*

(Continued)

*Primary Examiner* — Laurie A Ries
(74) *Attorney, Agent, or Firm* — Young Basile Hanlon & MacFarlane, P.C.

(57) ABSTRACT

User-generated graphical elements are added to a whiteboard. A content request is transmitted to a language processing model. The content request includes a textual document describing graphical elements of the whiteboard and a semantic description associated with the whiteboard. The graphical elements of the whiteboard may include the user-generated graphical elements. An updated textual document that includes graphical elements generated by the language processing model is received from the language processing model. The updated textual document is rendered in association with the whiteboard.

20 Claims, 10 Drawing Sheets

(56) References Cited

U.S. PATENT DOCUMENTS

| | | | | |
|---|---|---|---|---|
| 2012/0169772 | A1* | 7/2012 | Werner | G06F 3/0481 345/660 |
| 2014/0365918 | A1* | 12/2014 | Caldwell | G06F 3/0481 715/753 |
| 2018/0300302 | A1* | 10/2018 | Holley | G06F 40/171 |
| 2019/0108493 | A1* | 4/2019 | Nelson | G06Q 10/1095 |
| 2020/0320166 | A1* | 10/2020 | Rouaix | G06F 40/186 |
| 2021/0042662 | A1* | 2/2021 | Pu | G06Q 50/01 |
| 2021/0342785 | A1* | 11/2021 | Mann | G06F 40/186 |
| 2023/0118500 | A1* | 4/2023 | Shapiro | G06Q 10/101 353/69 |
| 2023/0237192 | A1* | 7/2023 | Kahan | G06V 10/60 726/1 |
| 2024/0028350 | A1* | 1/2024 | Sharma | G06F 3/04855 |
| 2024/0129148 | A1* | 4/2024 | Clegg | G06F 40/35 |
| 2024/0177358 | A1* | 5/2024 | Maurer | G06F 40/40 |
| 2024/0265193 | A1* | 8/2024 | Schafer | G06F 40/169 |
| 2024/0311576 | A1* | 9/2024 | Mikutel | G06F 3/0484 |
| 2024/0329802 | A1* | 10/2024 | Katahanas | G06F 3/04845 |
| 2025/0086865 | A1* | 3/2025 | Menges | G06T 11/00 |

FOREIGN PATENT DOCUMENTS

| | | | | |
|---|---|---|---|---|
| WO | WO-2021141688 A1 * | 7/2021 | ......... | G06F 3/04817 |
| WO | WO-2022104606 A1 * | 5/2022 | ............. | G06F 9/451 |

OTHER PUBLICATIONS

Lemma, Remo, et al, "CEL: Touching Software Modeling in Essence", 2015 IEEE 22nd International Conference on Software Analysis, Evolution, and Reengineering (SANER), Apr. 8, 2015, pp. 439-448. (Year: 2015).*

Schafer, Bernhard, et al, "Sketch2Process: End-to-End BPMN Sketch Recognition Based on Neural Networks", IEEE Transactions on Software Engineering (vol. 49, Issue: 4, 2023, pp. 2621-2641). (Year: 2023).*

Jeda.ai, World's first Generative AI Online Whiteboard, https://www.jeda.ai/online-whiteboard, retrieved from internet Sep. 12, 2023, 12 pages.

YouTube, Jeda.ai all "/ commands" for Help Center, https://www.youtube.com/watch?v=FG4U8QAqLm0&list=TLGG8AfF1ZYW1rcwNDA4MjAyMw&t=21s, Jedaai, Jun. 5, 2023, 2 pages.

YouTube, Jeda.ai—Template Analysis for Help Center, https://www.youtube.com/watch?v=2HuJj6mNSKs&list=TLGG-QA0S63cne8wNDA4MjAyMw&t=13s, Jedaai, Jun. 5, 2023, 2 pages.

TechTarget, Unified Communications, Whiteboard collaboration app Miro to get generative AI tools, https://www.techtarget.com/searchunifiedcommunications/news/366538361/Whiteboard-collaboration-app-Miro-to-get-generative-AI-tools?Offer=abt_pubpro_AI-Insider, Mary Reines, May 24, 2023, 4 pages.

* cited by examiner

1. GENERIC WHITEBOARD DESCRIPTION —— 802
LET THERE BE A WHITEBOARD DOCUMENT, WHICH IS A JSON DOCUMENT THAT IS A DESCRIPTION OF THE GRAPHICAL OBJECTS IN A DIGITAL WHITEBOARD. THE DOCUMENT IS AN ARRAY OF OBJECTS, WHERE EACH OBJECT IS A SET OF PROPERTIES THAT DESCRIBE THE SIZE, LOCATION, COLOR, TEXT, AND OTHER RELEVANT PROPERTIES. FOR EXAMPLE, A DOCUMENT SURROUNDED BY FOUR DASHES.
----{WB_GENERIC_CONTENT_DESCRIPTION}----

2. TEMPLATE DESCRIPTION —— 806
HERE IS A TEMPLATE FOR A WHITEBOARD THAT IS USED FOR {TEMPLATE_NAME}. {TEMPLATE_USE}. {TEMPLATE_GRAPHICAL_DESCRIPTION}.
THE JSON DOCUMENT FOR THE EMPTY TEMPLATE IS SURROUNDED BY THREE DASHES.
---{EMPTY_TEMPLATE_GRAPHICS_CONTENT}---

3. CURRENT WHITEBOARD DESCRIPTION —— 808
HERE IS THE CURRENT WHITEBOARD THAT HAS THE TEMPLATE PLUS ANY USER-CREATED CONTENT:
{WB_CONTENT}.

4. LPM ACTION PROMPT —— 810
BASED ON THAT WHITEBOARD, {USER_PROMPT}. YOUR COMPLETION IS TO BE A NEW JSON DOCUMENT THAT {DESIRED_RESPONSE} WITHOUT ANY EXPLANATORY TEXT.

—— 800

```
[
  { "TYPE": "SHAPE",
    "SHAPETYPE": "RECTANGLE",
    "LEFT": 100,
    "TOP": 100,
    "WIDTH": 100,
    "HEIGHT": 100,
    "COLOR": "BLUE" },

{ "TYPE": "TEXT",
    "TEXT": "HELLO WORLD",
    "LEFT": 150,
    "TOP": 150,
    "FONTSIZE": 14,
    "COLOR": "RED" },

{ "TYPE": "SHAPE",
    "SHAPETYPE": "CIRCLE",
    "LEFT": 250,
    "TOP": 250,
    "RADIUS": 50,
    "COLOR": "GREEN" }
]
```

WHITEBOARD CONTENT GENERATION USING LANGUAGE PROCESSING MODELS

FIELD

This disclosure generally relates to whiteboards and, more specifically, to whiteboard content generation using a language processing model (LPM).

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 illustrates an example of a content request for generating whiteboard content.

DETAILED DESCRIPTION

Figure 1:
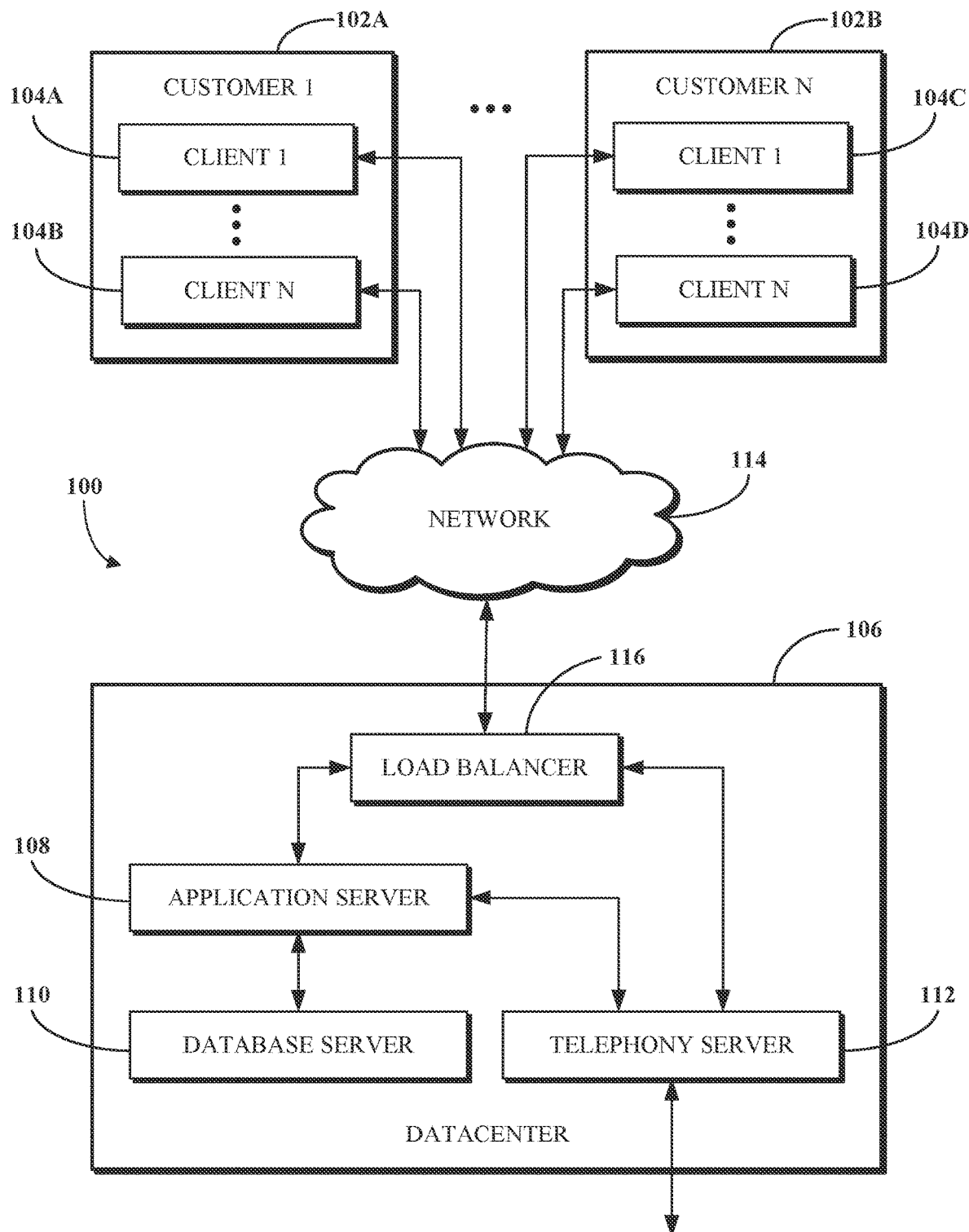
FIG. 1 is a block diagram of an example of an electronic computing and communications system.

A digital whiteboard, also referred to herein as a whiteboard, is a virtual space within which a number of people can collaborate on a project. Users of a digital whiteboard software may collaborate by adding, modifying, and/or removing content (e.g., text boxes, drawing spaces, and sticky notes) within a whiteboard for current or future consideration by themselves or others. Users of a digital whiteboard software may access a whiteboard individually, or they may participate in an active whiteboard session (i.e., a real-time event in which a whiteboard is simultaneously accessed by multiple users) to create documents, brainstorm ideas, and otherwise work together towards a project goal. For example, users of a digital whiteboard software may participate in an active digital whiteboard session via a video conference, in which the users are participants to the video conference and the whiteboard is shared to the video conference to facilitate the active digital whiteboard session.

Language processing models (LPMs), such as Large Language Models (LLMs), have been designed and trained to comprehend and generate human-like text based on the input they receive. LPMs are capable of a wide range of natural language understanding and generation tasks, making them suitable for processing and interpreting textual descriptions in various software applications. Enabling users of a whiteboard software to engage in open-ended queries and tasks using an LPM to analyze and refine content on their whiteboards would be highly desirable. For example, it would be desirable for an LPM to provide answers to user questions related to whiteboard, edit existing content, or generate new content on the whiteboard.

However, a whiteboard may be or otherwise include a set of graphics elements. While LPMs are proficient at generating text-based content, they cannot interpret or reason about graphical content (e.g., as may be present in a whiteboard). Furthermore, a whiteboard may lack inherent or intrinsic semantic meaning, making it challenging for LPMs to comprehend and manipulate the content of the whiteboard. The semantic context and intended purposes associated with a particular whiteboard usually reside within the cognizance of the user of the whiteboard. To illustrate, an individual utilizing a whiteboard for a sprint retrospective, which is an integral part of the agile development methodology and the Scrum framework, would possess insights into the intricacies of its content, such as detailing achievements, identifying issues, and proposing future actions.

The implementations of this disclosure address problems such as these by augmenting a whiteboard template (from which whiteboards are instantiated) with additional information that instructs (e.g., is usable by) an LPM on how to interpret and understand the template's graphical structure as well as the intended use of the template (e.g., of whiteboards instantiated therefrom). A whiteboard template is or includes a pre-formatted graphical structure and layout that can be used as a base to create many whiteboards.

The content of a whiteboard are transmitted to the LPM as a structured document that describes the graphical elements of the whiteboard, properties therefor, and relationships therebetween. The structured document can be in a JavaScript Object Notation (JSON), extensible Markup Language (XML), or some other structured format. To respond to a content request, the LPM can be trained to understand the structure and to generate completions (i.e., responses) that adhere to the same structured format. As such, the generated completion follows the inherent layout resembling that of a whiteboard. Consequently, there's no necessity for a whiteboard software to undertake post-processing of the document provided by the LPM before visualizing the content on the whiteboard.

In some implementations, generating whiteboard content using an LPM includes adding user-generated graphical elements to a whiteboard; transmitting a content request to a language processing model, the content request comprising a textual document describing graphical elements of the whiteboard and a semantic description associated with the whiteboard, where the graphical elements of the whiteboard include the user-generated graphical elements; receiving, from the language processing model, an updated textual document that includes graphical elements generated by the language processing model; and rendering the updated textual document on the whiteboard.

To describe some implementations in greater detail, reference is first made to examples of hardware and software structures used to implement a system for generating whiteboard content using LPMs. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
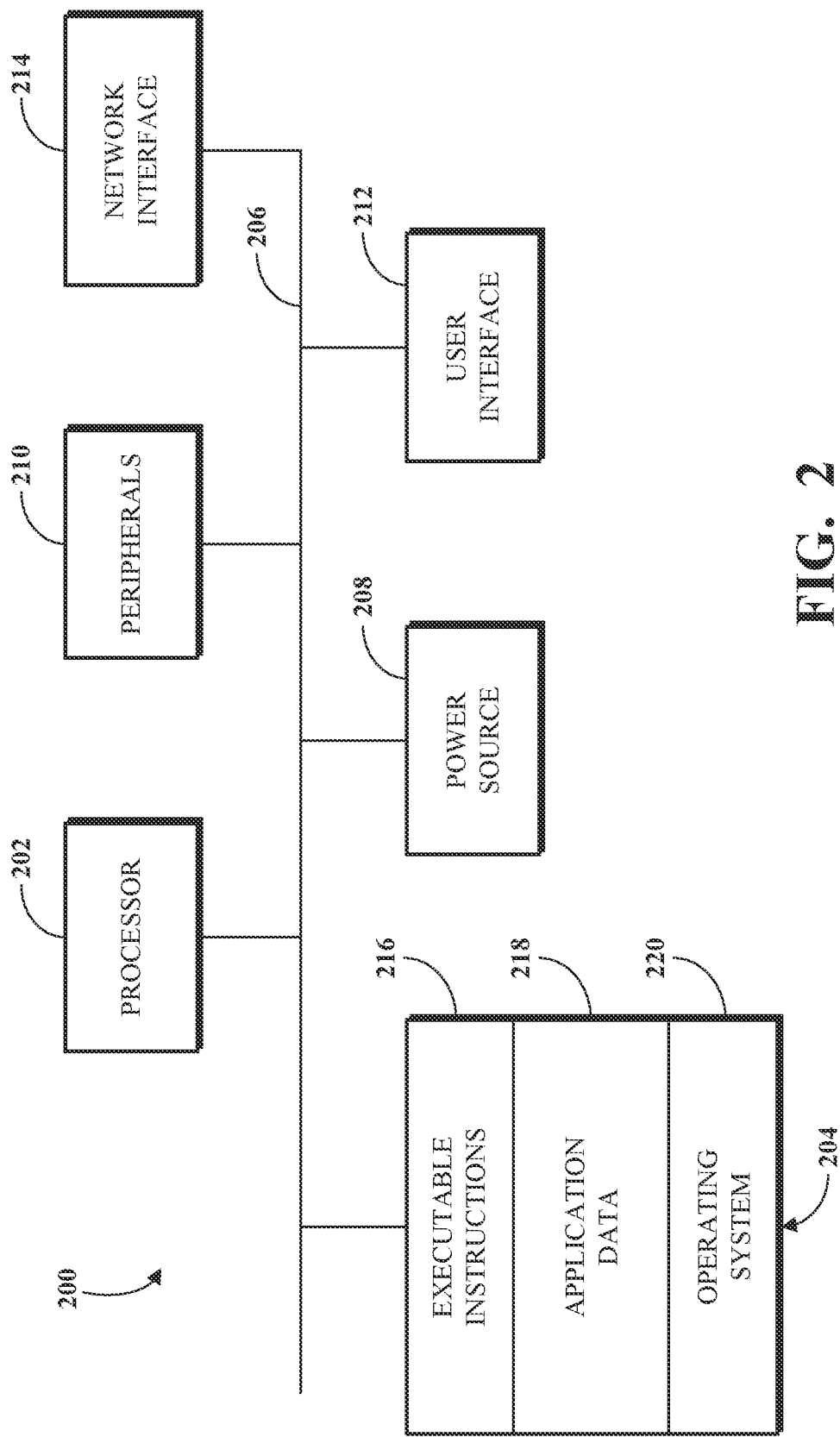
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
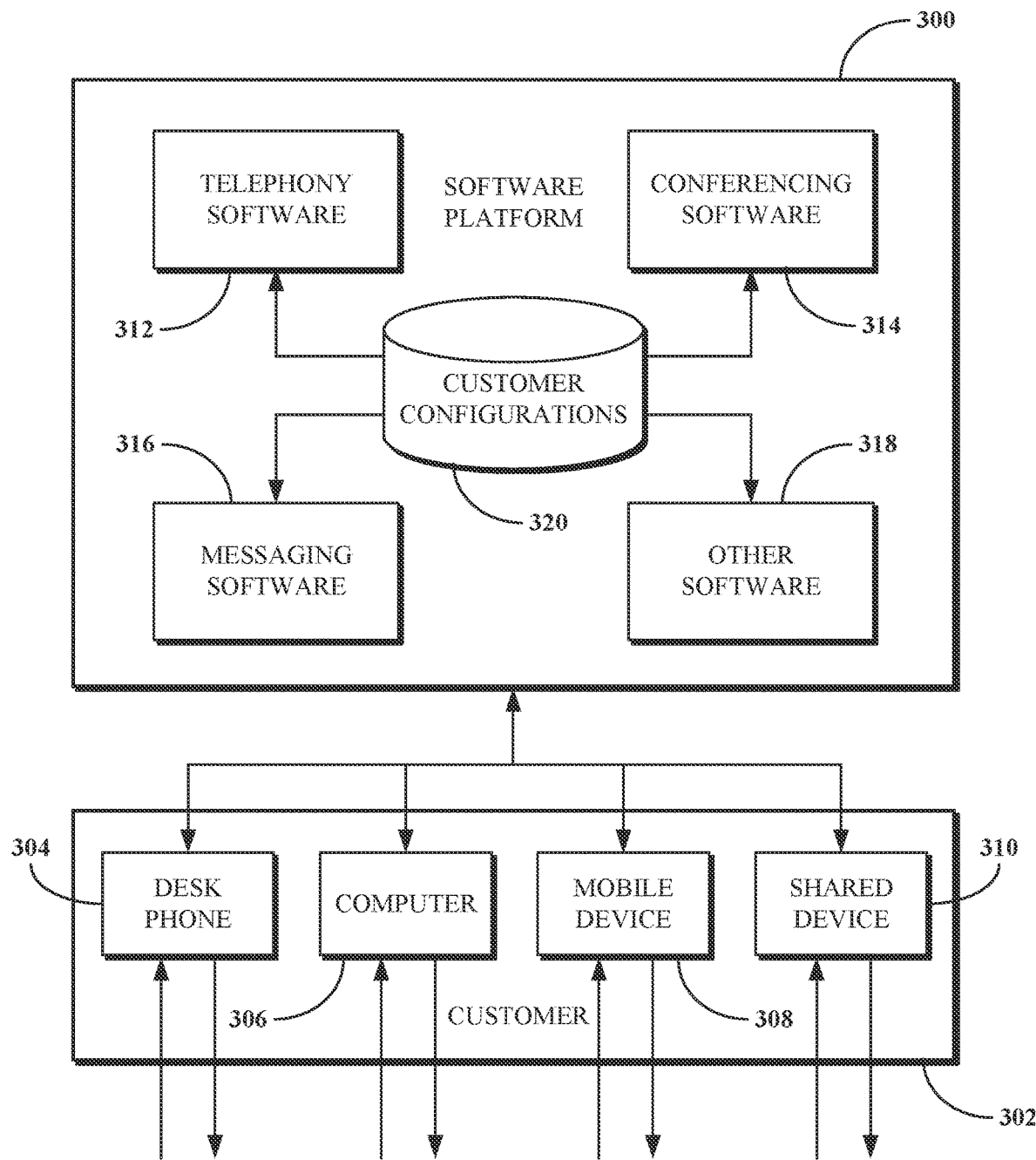
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a whiteboard software that can cause whiteboard content to be generated using LPMs.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
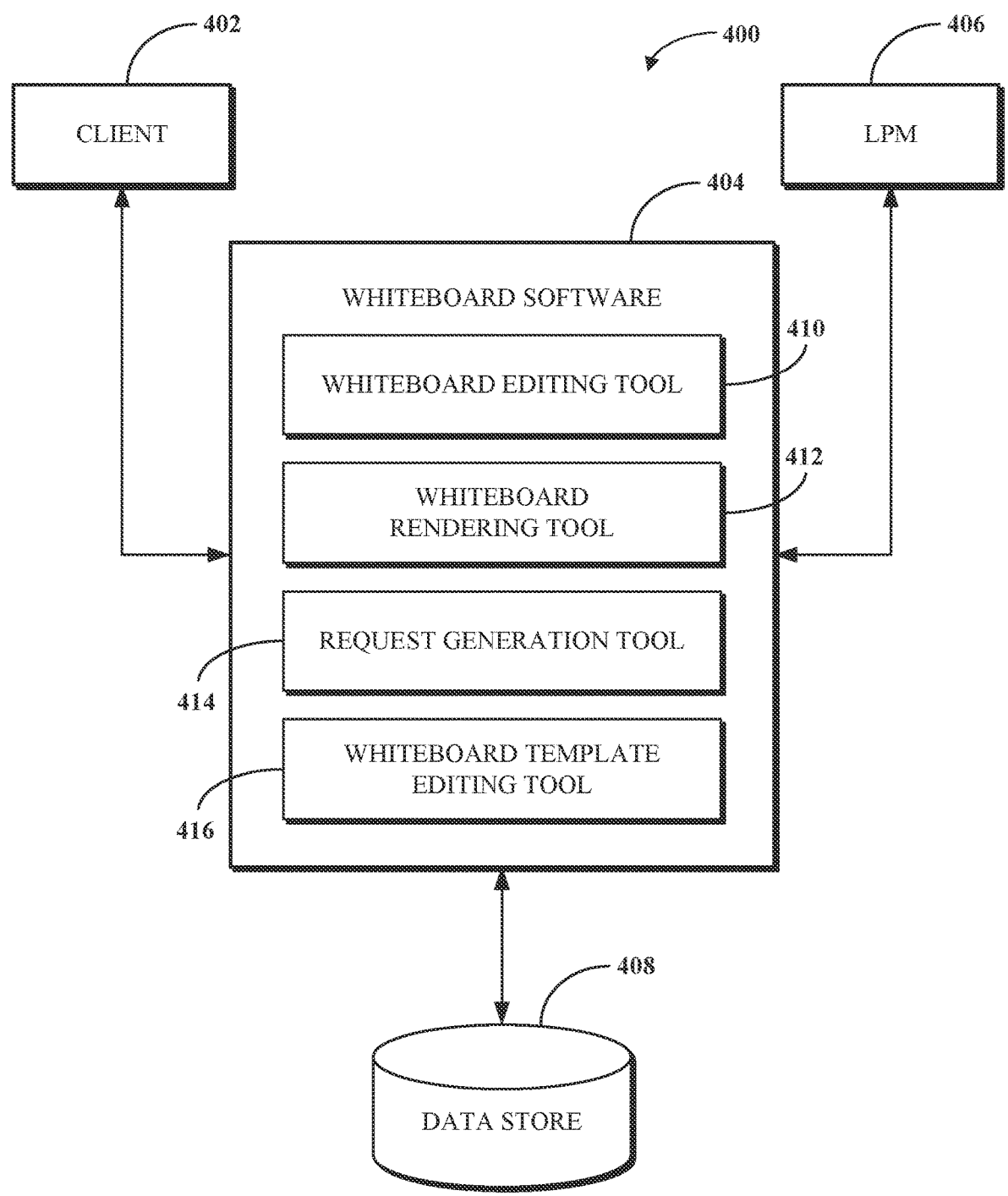
FIG. 4 is an example of a system for generating whiteboard content using an LPM.

FIG. 4 is an example of a system 400 for generating whiteboard content using an LPM. The system 400 is shown as including a client 402, a whiteboard software 404, an LPM 406, and a data store 408.

The client 402 may be one of the clients 304 through 310 shown in FIG. 3 that runs a client application associated with the whiteboard software 404 or is usable to access functionality associated with or provided by the whiteboard software 404. Although one client is shown in FIG. 4, other numbers of clients can simultaneously connect to the whiteboard software 404.

The whiteboard software 404 enables a virtual canvas that users may be configured (e.g., enabled or permitted) to access. Different permissions may be associated with different users of a whiteboard. To illustrate, and without limitations, some users (having associated therewith a modify permission) may be permitted to create and modify (e.g., add, edit, or modify graphical elements thereon) a whiteboard and some other users (not having associated therewith the modify permission) may be permitted to only view the contents of the whiteboard or add comments to the whiteboard. Modifying (e.g., editing) a whiteboard can include one or more of adding content to the whiteboard, deleting content from the whiteboard, changing content of the whiteboard, or changing the arrangement of content in the whiteboard. Other permissions or combinations thereof are possible.

The LPM 406 can be a general purpose language model, which can be an LLM, that operates by comprehending and generating human-like text based on the input it receives. The LPM 406 can be said to possess a deep understanding of various languages, grammar structures, and contextual nuances, enabling it to engage in tasks such as content generation, text completion, and more. The LPM 406 may be trained to utilize a vast array of pre-learned patterns and linguistic knowledge to produce coherent and contextually relevant outputs in a manner that simulates human language understanding and production.

The LPM 406 can be or can be available via a remote system that is communicatively connected to the whiteboard software 404. For example, the LPM 406 may be or may be part of cloud-based system. In another example, the LPM 406 can be part of the whiteboard software 404 or part of a software platform, such as the software platform 300, which may also include the whiteboard software 404. In yet another example, the LPM 406 may be deployed at the datacenter 106 shown in FIG. 1. As clients become more and more computationally and resource capable, it is foreseeable that, in some implementations, the LPM 406 (or an LPM that may be trained for certain domains only) may also be implemented by the client 402.

As further described herein, content requests may be transmitted to the LPM 406. There can be two different types of content requests: content requests that modify the whiteboard and content requests that do not modify the whiteboard. Users with the modify permission may be able to cause content requests that modify the content of a whiteboard to be transmitted to the LPM 406. On the other hand, users who do not have the modify permission may only execute content requests that do not modify the whiteboard.

The whiteboard software 404 includes tools, such as programs, subprograms, functions, routines, subroutines, operations, executable instructions, and/or the like for, inter alia and as further described below, enabling users to create and edit whiteboards and use an LPM (e.g., the LPM 406) in conjunction with the whiteboard, such as to generate content for the whiteboard. At least some of the tools of the whiteboard software 404 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the whiteboard software 404 includes a whiteboard editing tool 410, a whiteboard rendering tool 412, a request generation tool 414, and a whiteboard template editing tool 416. In some implementations, the whiteboard software 404 can include more or fewer tools. In some implementations, some of the tools may be combined, some of the tools may be split into more tools, or a combination thereof.

The whiteboard editing tool 410 enables users, such as a user of the client 402, to modify whiteboards. A user can modify a whiteboard by adding graphical elements (e.g., text, shapes, images, stickers, icons, animations, or videos) to the whiteboard. The user can associate properties with at least some of the graphical elements. To illustrate, properties associated with a rectangle may include a width, a height, a foreground color, a background color, and a text alignment; properties associated with a text graphical element may include a font name, a font size, and a font style; and properties associated with a group of graphical elements may include an alignment (e.g., top, left, center, etc.) of the graphical elements. The whiteboard editing tool 410 may enable the user, via user interface controls, to set such properties implicitly or explicitly. The whiteboard editing tool 410 may enable the user to add graphical elements via a toolbox. The toolbox may include primitive graphical elements (e.g., lines, boxes, circles, text, kanban board, etc.) that the user can add to their whiteboard.

The whiteboard software 404 maintains (e.g., stores), such as in the data store 408, locations of edited content or comments added to the whiteboard along with the respective users who added the content or made the comments. Content that is modified or added based on a content request to the LPM 406 can be so indicated, as illustrated in an example with respect to FIG. 7B.

The whiteboard editing tool 410 also enables users to create whiteboards. A new whiteboard may be instantiated from a whiteboard template. That is, the whiteboard software 404 may include or have access to a set (e.g., a list) of whiteboard templates. To illustrate, and without limitation, the list of whiteboard templates may include a Pros and Cons template, a Kanban Table template, a Mind Map template, a Sprint Retrospective template, an XY Plot template, a Bull's Eye template, and so on. Whiteboard templates (e.g., object descriptions thereof) may be stored in the data store 408.

To create a whiteboard, a user may select a desired whiteboard template and cause the whiteboard editing tool 410 to create the whiteboard therefrom. Creating a whiteboard from a whiteboard template (also referred to as instantiating the whiteboard template) includes creating a copy of the whiteboard template as a starting point for the whiteboard.

Figure 5:
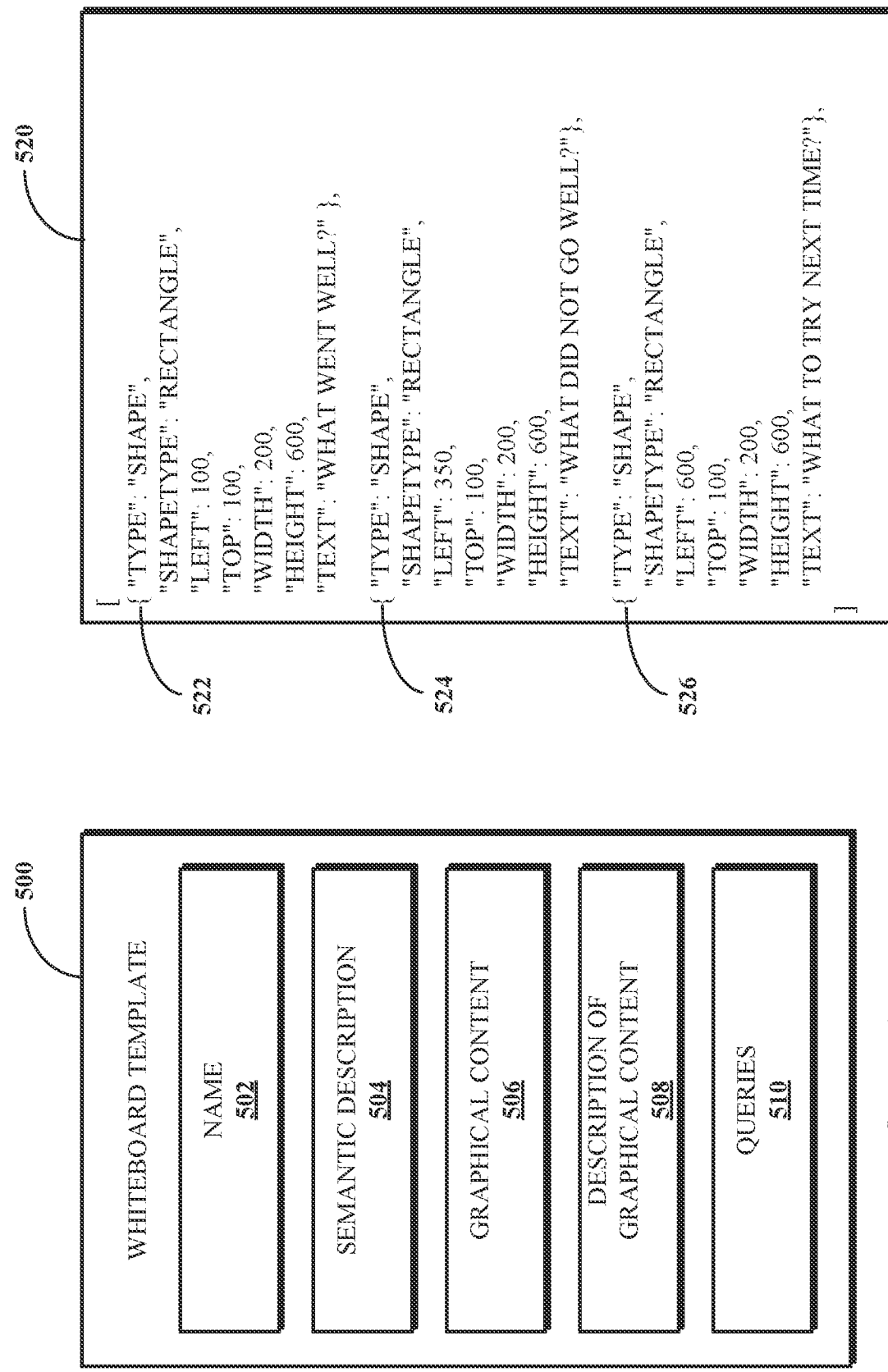
FIG. 5A illustrates a data structure of a whiteboard template.
FIG. 5B illustrates an example of graphical content.

Metadata may be associated with a whiteboard template. At least some of the metadata may be copied to the whiteboard. Some of the metadata of the whiteboard template may be viewable (but not modifiable) by the whiteboard users. Whether the metadata is copied to the whiteboard or not, the metadata is referred to herein as being associated with the whiteboard. A whiteboard template may include metadata usable for generating content requests for the LPM 406. An example of an object representation (e.g., structure) of a whiteboard template is described with respect to FIG. 5A.

The whiteboard rendering tool 412 renders a whiteboard on a display, such as a display of the client 402 or a display of the user interface 212 of FIG. 2. As can be appreciated, whiteboards are persistent objects and can be stored in the data store 408. In response to a request to retrieve a stored whiteboard, the whiteboard rendering tool 412 may retrieve the whiteboard from the data store 408 and cause the whiteboard to be rendered at the display of the client 402. More accurately, the whiteboard, as visually displayed at the client 402, is a visual representation of the stored content and layout of the whiteboard object. The content and layout (referred to as graphical elements) may be stored in the data store 408 as a structured document (e.g., a JSON or XML). The whiteboard rendering tool 412 retrieves the structured document, identifies the graphical elements therein, and renders these graphical elements at the client 402.

Whatever processing is performed by the whiteboard software 404 on whiteboard objects (e.g., graphical elements therein) retrieved from the data store 408 for rendering at a display is referred to herein as "native processing." In some implementations, however, a whiteboard may not be stored in the data store 408 as a structured document; rather, there can be a direct mapping between a structured document and an underlying data representation stored in the data store 408. To illustrate, the whiteboard software 404 may extract a whiteboard object from the data store 408, convert the whiteboard object to a structured document, such as for transmission to another system (e.g., the LPM 406). If the LPM 406 receives a whiteboard object in the same structured format and includes data that the whiteboard software 404 can natively interpret and/or process, then processing the received structured document is still considered to be "native processing." That is, native processing encompasses situations where there is a clear and direct correspondence between a structured document and the data representation, in the data store 408, that constitutes the content and attributes of the whiteboard.

The whiteboard rendering tool 412 can also be used to render a whiteboard based on a structured document received from the LPM 406. The whiteboard rendering tool 412 natively renders the structured document received from the LPM 406. In an example, the whiteboard rendering tool 412 may identify differences between a document representing the current content of the whiteboard and the document received from the LPM 406 and only render those differences. In another example, the LPM 406 may be instructed to include highlights (e.g., annotations) to graphical elements that the LPM 406 modifies or adds. To illustrate, an instruction to the LPM may essentially state "highlight elements you add by adding the properties: 'generated: true' to them" or some such similar directives/instructions. In either case, such processing is still considered native processing. In an example, the whiteboard rendering tool 412 may adorn graphical elements generated by the LPM 406 so that such objects are easily distinguishable by the user. The whiteboard rendering tool 412 may add an icon, a sticker, or some other adornment that indicates to the user that the graphical element is generated by the LPM 406. Adorning a graphical elements is not considered to be a modification to the native processing of the structured document.

The request generation tool 414 formulates and transmits content requests to the LPM 406. The content request may include an input, a specific request for output, and instructions to the LPM 406 intended to teach or instruct the LPM 406 on how to interpret (e.g., understand and/or inference based on) the input and, in the case of whiteboard-modifying contents requests, to generate the output in such a way that the output is natively processable by the whiteboard software 404. That is, the output received from the LPM 406 is desirably in a format that is native to the LPM 406 and is renderable (e.g., turned into a visual display at the client 402) by the whiteboard editing tool 410 without processing not typically performed with respect to whiteboards retrieved from the data store 408. To formulate a content request, the request generation tool 414 may use metadata associated with the whiteboard. At least some of the metadata may be obtained from the whiteboard template associated with the whiteboard. As mentioned above, some content requests may modify a whiteboard but other content requests may not. The content requests that may not modify the whiteboard may be those that generate content (inferences) based on the content of the whiteboard but may not be intended to modify the whiteboard.

The whiteboard template editing tool 416 enables an authorized user to create or modify whiteboard templates. Via the whiteboard template editing tool 416, the authorized can set metadata usable by the request generation tool 414 in formulating content requests to be transmitted to the LPM 406. An example of a user interface for creating or modifying a whiteboard template is described with respect to FIG. 6.

The data store 408, and as already mentioned, can store whiteboards (e.g., whiteboard objects), which can include respective structured documents and associated metadata. The data store 408 can also store whiteboards templates. The data store 408 can store associations between whiteboards and whiteboard templates instantiated therefrom. The data store 408 may be a database or other data store that is available at a database server, such as the database server 110 shown in FIG. 1.

FIG. 5A illustrates a data structure 500 of a whiteboard template. The data structure 500 is used to describe data that can be associated with a whiteboard template. The data structure 500 is shown as including a name 502, a semantic description 504, graphical content 506, a description of the graphical content 508, and queries 510. Other data can be associated with a whiteboard template. The name 502, the semantic description 504, the description of the graphical content 508, and the queries 510 can be considered metadata associated with the whiteboard template.

The name 502 can be a short string that concisely indicates the intended purpose, utility, and graphical content of the whiteboard template. The semantic description 504 describes the purpose of whiteboards created using the whiteboard template, offering insight into the intended use cases and functionalities. The semantic description 504 can aid users (including an LPM, such as the LPM 406 of FIG. 4) in understanding the context in which the whiteboard template is best employed. By outlining the intended applications and capabilities, the semantic description 504 provides a comprehensive guide for maximizing the utility of the whiteboard template and achieving optimal results in various scenarios. For example, the LPM 406 of FIG. 4 can use the semantic description to understand the intended use of whiteboards instantiated from the template. To illustrate, with respect to the aforementioned Sprint Retrospective template, the semantic description 504 may be: "A sprint retrospective, which is whiteboard is a dedicated space where teams gather at the end of a development sprint to reflect on their recent accomplishments and challenges. It features sections for reviewing what went well, identifying areas for improvement, and devising actionable strategies to enhance future sprints, fostering continuous growth and collaboration."

The graphical content 506 can be a structured document that describes the graphical content of the whiteboard template and that can be rendered by the whiteboard rendering tool 412 of FIG. 4. A drawing toolbox can be used to draw the graphical elements of the whiteboard and, upon saving the whiteboard, the whiteboard software 404 can save the graphical elements as the graphical content 506. An example of the graphical content 506 is described with respect to FIG. 5B.

FIG. 5B illustrates an example 520 of the graphical content 506 of FIG. 5A. The example 520 illustrates a structured document that describes three graphical elements (e.g., graphical elements 522, 524, and 526) and properties associated therewith. For example, the properties associated with the graphical element 522 indicate that it is to be rendered as a rectangle having dimensions 200×600 pixels and that is to be placed at Cartesian location (100, 100) from a reference origin on the whiteboard (e.g., a top-left corner). The graphical element 522 includes the textual string "WHAT WENT WELL?" Other properties that those shown herein may be associated with a graphical element. In an example, if a property is not specified, then it is assumed to have a default value. For example, the default location property for the textual string may be "top, center." As such, the textual string "WHAT WENT WELL?" is rendered at the top, center position of the rectangle.

Referring again to FIG. 5A, the description of the graphical content 508 can provide a textual, human readable, and understandable description of the graphical elements (i.e., of the graphical content 506) of the template and their respective arrangements. For example, with respect to the graphical content 506 of FIG. 5B, the graphical content 508 may be: "The template for a whiteboard that is used for a sprint retrospective includes three rectangles. On the left is a rectangle for things that went well. In the middle is a rectangle for items that did not go well. On the right is a rectangle for things to try next time. Within each of these rectangles, there can be sticky notes for the different ideas."

The queries 510 can be a set of questions relevant to (e.g., specific to) the whiteboard template and are provided as a convenience to users of the whiteboard template (i.e., to the users who instantiate whiteboards from the whiteboard template). The queries 510 can be or includes a set of questions for which an LPM, such as the LPM 406 of FIG. 4, can provide answers. Each of the queries 510 may be indicated (e.g., flagged) as being whiteboard-modifying or not. That is, if a query is expected to add graphical elements to the whiteboard, then the query is whiteboard-modifying. To illustrate, with respect to the Sprint Retrospective template, a whiteboard-modifying query may be "What should we try next?;" and a non-whiteboard-modifying query may be "what may be the common denominators for what didn't go well?" As described herein, if the user query is whiteboard-modifying, then the LPM is trained (e.g., instructed) to return a response that is a structured document renderable by the whiteboard software; on the other hand, if the user query is not whiteboard-modifying, then the LPM can simply return a text string that may be displayable in a pop-up window, a text field, or the like. Other properties associated with a query are further described with respect to FIG. 6.

Figure 6:
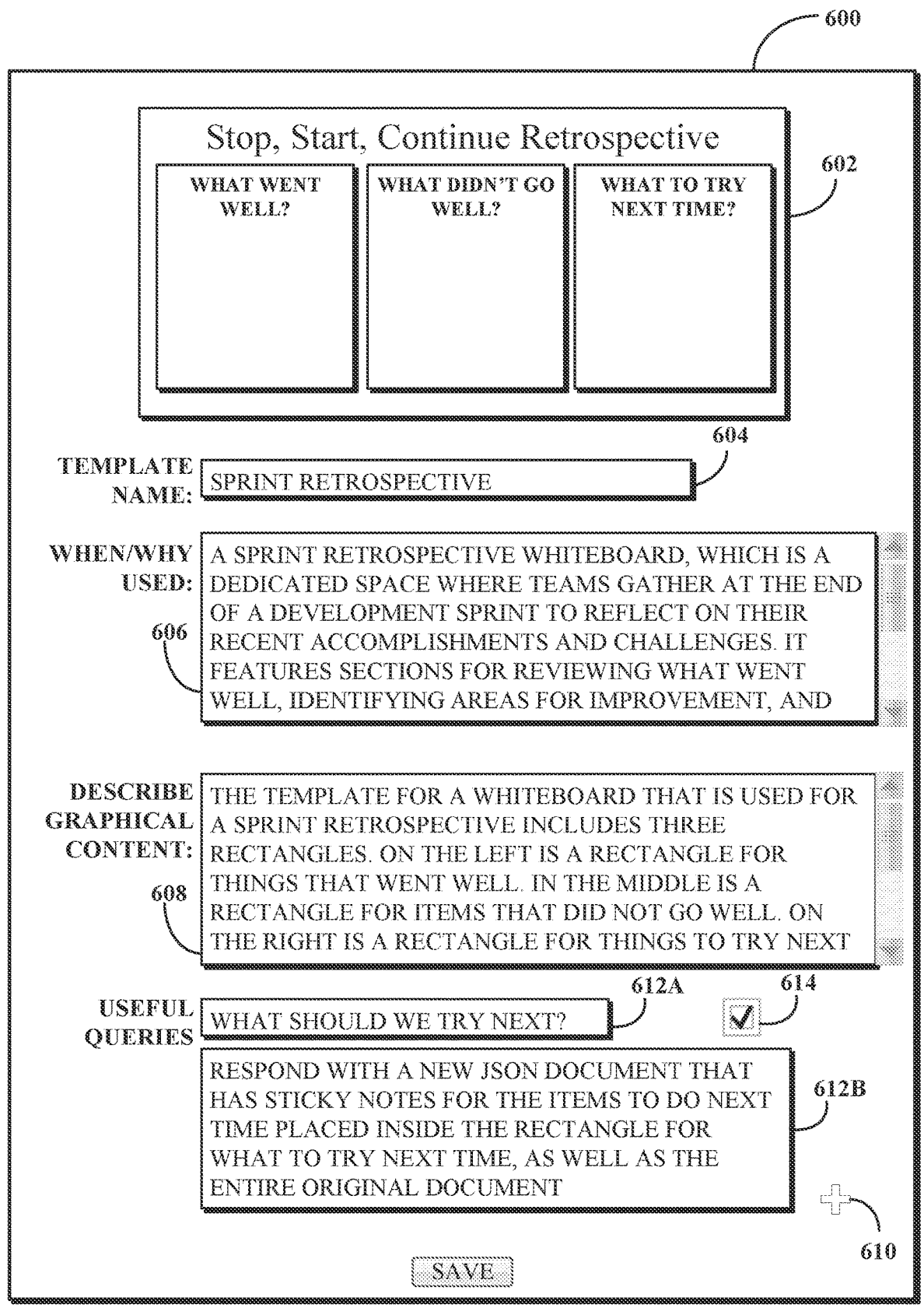
FIG. 6 in an example of a user interface for creating and editing whiteboard templates.

FIG. 6 in an example of a user interface 600 for creating and editing whiteboard templates. The user interface 600 can be associated with a whiteboard software, such as the whiteboard software 404 of FIG. 4. Via the user interface 600, metadata usable for generating content requests to an LPM, such as the LPM 406 of FIG. 4, can be associated with the whiteboard template. For brevity, the user interface 600 only includes controls and data entry fields relevant to this disclosure. Other controls and data entry fields that would otherwise be included in the user interface 600 are omitted. For example, while not shown, the user interface 600 may otherwise include a toolbox that includes primitive graphical elements that can be added to a canvas to create the whiteboard template. Creating or editing a whiteboard template may be a multi-step process and the user interface 600 may be or may be part of one of the steps.

A canvas 602 illustrates the current state of the whiteboard template. That is, the canvas 602 shows all the graphical elements that have been added to the whiteboard template. The graphical elements of the whiteboard are saved, such as in a structured document, to the graphical content 506 of FIG. 5A. A field 604 enables the user to enter a user-friendly, descriptive name for the whiteboard template. The value entered in the fields 604 is saved to the name 502 of FIG. 5A. A field 606 enables the user to enter a semantic description for the whiteboard template. That is, the value entered in the field 606 is saved to the semantic description 504 of FIG. 5A. A field 608 enables the user to enter a description of the graphical content of the whiteboard template. That is, the value entered in the field 608 is saved to the description of the graphical content 508 of FIG. 5A.

A control 610 enables the user to add one or more queries to be saved to the queries 510 of FIG. 5A. A query can be composed of several fields including a user-prompt, a flag indicating whether the query is whiteboard-modifying, and an LPM-desired output. The user interface 600 illustrates that one query has already been entered. A user prompt 612A is a user-visible request for content generation and is usable as described with respect to FIG. 7A. An LPM-desired output 612B indicates to the LPM the parameters or constraints regarding the structure or content of the generated response to be received back from the LPM in response to a content request that is based on the query. A checkbox 614, since it is checked, indicates that the query is whiteboard-modifying. The whiteboard software can use the state (e.g., value) of the checkbox 614 to determine whether the response is a structured document that is to be rendered as a whiteboard or some other type of content that is to be displayed to the user in some other way.

Figure 7A:
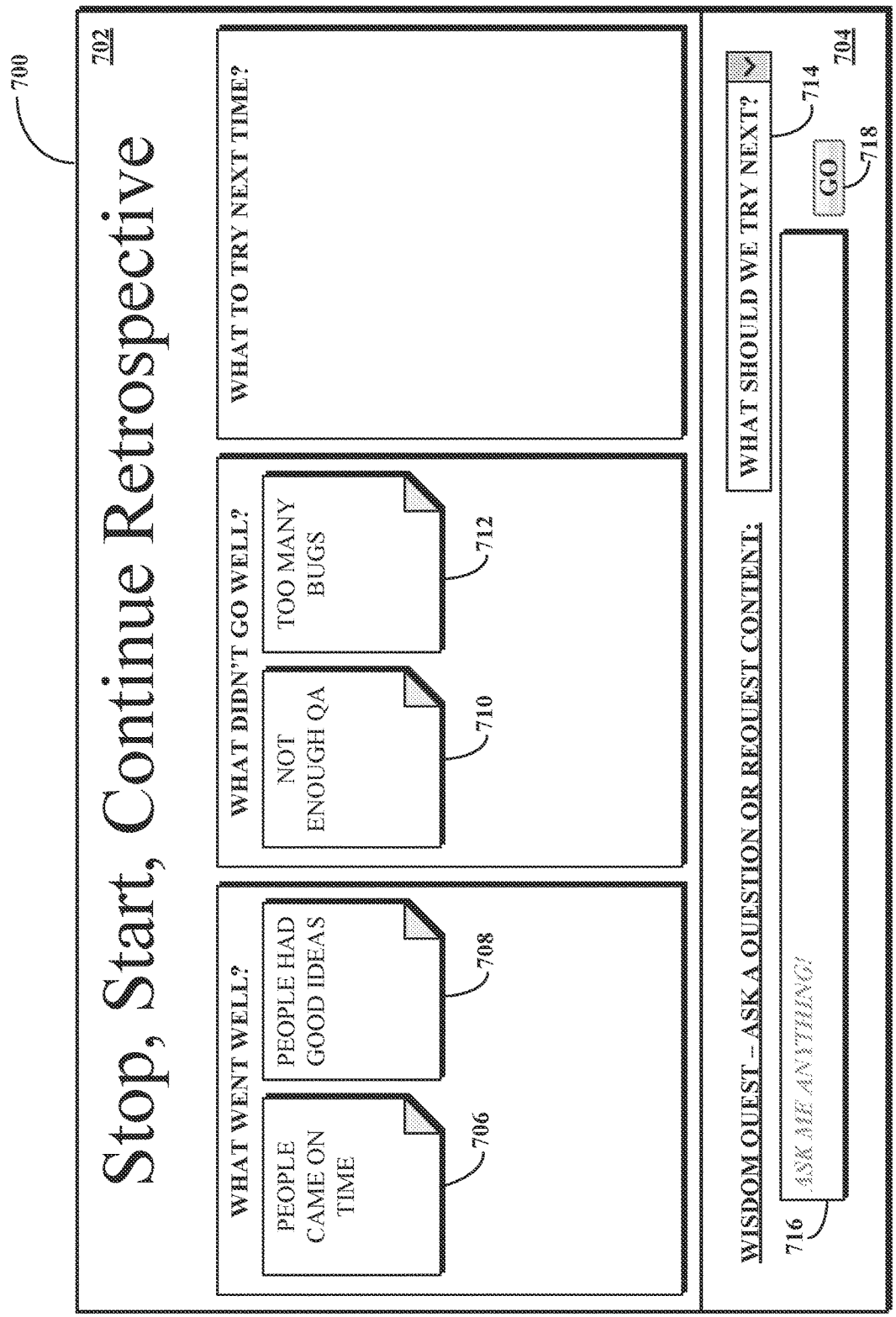
FIG. 7A-7B illustrate examples of whiteboard content generation using language processing models.
Figure 7B:
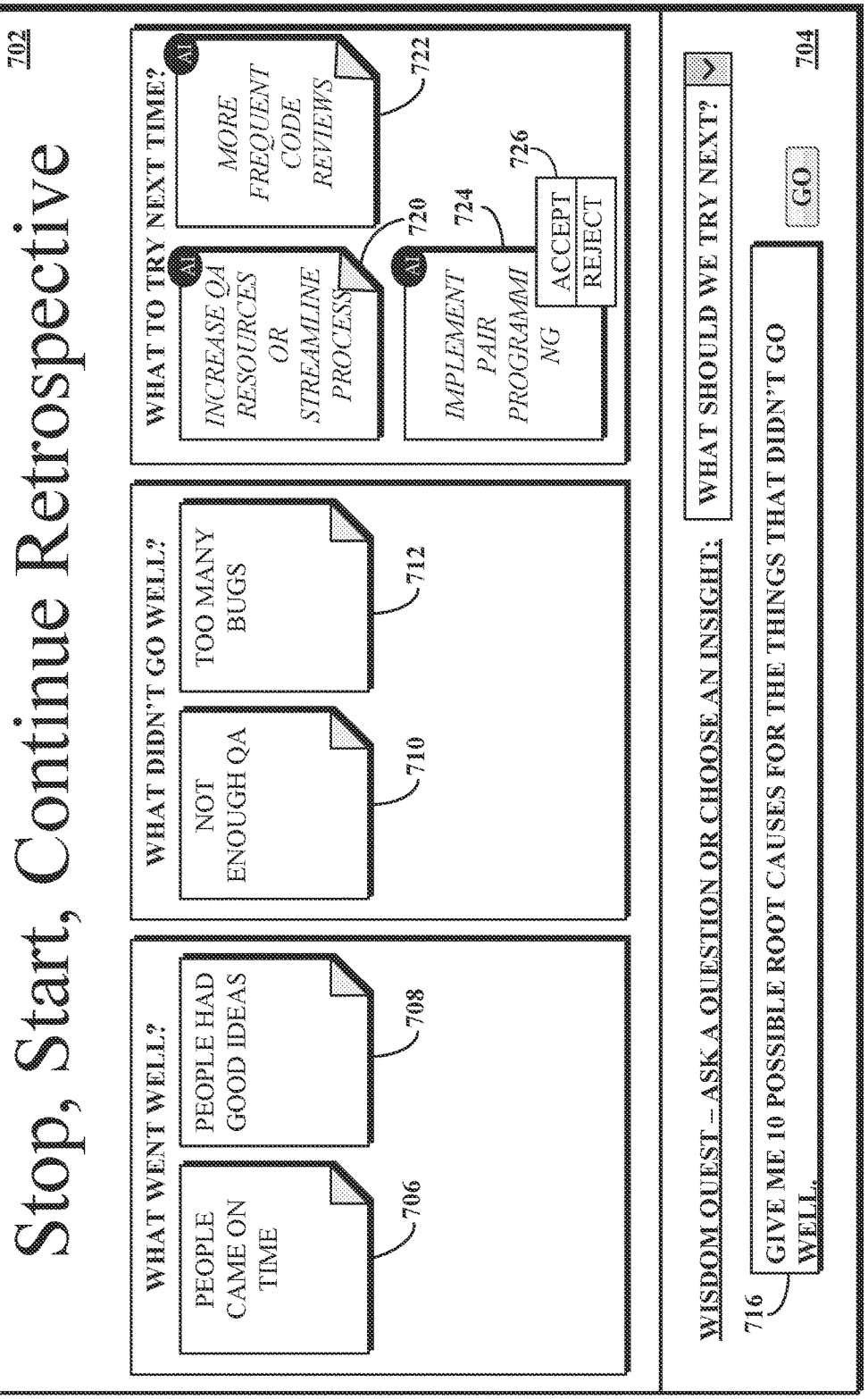

FIG. 7A-7B illustrate examples of whiteboard content generation using language processing models. FIGS. 7A-7B illustrate a user interface 700 that can be rendered by or caused to be rendered by a whiteboard software, such as the whiteboard software 404 of FIG. 4. The user interface 700 may include additional controls, such as a toolbox, usable by a user to edit the whiteboard. The user interface 700 includes a canvas area 702 and an LPM interface area 704. The canvas area 702 illustrates that the whiteboard template described with respect to FIG. 6 has been instantiated and that one or more users have added graphical elements 706 and 708 to the graphical element corresponding to the "what went well" category (e.g., rectangle) and graphical elements 710 and 712 to the graphical element corresponding to the "what didn't go well" category.

In the LPM interface area 704, a user may select a user prompt from a query drop down list 714. The whiteboard software populates the query drop down list 714 from the queries 510 associated with the whiteboard template from which the whiteboard is instantiated. In a free-form area 716, a user of the user interface 700 can formulate their own user prompt without being constrained to or by the queries available via query drop down list 714. In response to the user invoking a control 718, a content request is formulated and transmitted to an LPM, such as the LPM 406 of FIG. 4. An example of a content request is described with respect to FIG. 8.

FIG. 7B illustrates that the whiteboard of FIG. 7A has been updated with content received from the LPM. The canvas area 702 illustrates that the whiteboard rendering tool of the whiteboard software has rendered the structured document received from the LPM in response to the content request. More specifically, the whiteboard has been updated to include the additional graphics elements 720, 722, and 724. In an example, and as illustrated, the graphical elements added by the LPM may be highlighted so that they are visually distinguishable from user-generated graphical elements. As shown, highlighting an LPM generated graphical element includes italicizing any text therein and adorning the graphical element with an "AI" sticker. However, any other useful highlighting may be used.

Via a menu 726 (e.g., a right-click menu), the user may accept an LPM generated graphical element or reject it. If the LPM generated graphical element is accepted, then any highlighting applied to the LPM generated graphical element is removed. If the LPM generated graphical element is rejected, then the LPM generated graphical element is removed (e.g., deleted) from the whiteboard. As such, the whiteboard software may receive a command (e.g., the "accept" menu item) from the user to add an LPM generated graphical element to the whiteboard. The whiteboard software may receive another command (e.g., the "reject" menu item) from the user to remove another LPM generated graphical element from the whiteboard.

FIG. 7B also illustrates that the user has entered a free-form query in the free-form area 716. Specifically, the user is asking the LPM to "GIVE [ ] 10 POSSIBLE ROOT CAUSES FOR THE THINGS THAT DIDN'T GO WELL." While not shown, the response from the LPM to the free-form query may be displayed to the user, such as in a pop-up window, in another user interface element of the user interface 700, or in some other way. In an example, the response from the LPM may be appended to or displayed in the free-form area 716.

FIG. 8 illustrates an example of a content request 800 for generating whiteboard content. The content request 800 may be formulated by the request generation tool 414 of FIG. 4 and transmitted to the LPM 406 of FIG. 4. For ease of understanding, the content request 800 is divided into sections. Each section is delineated by a comment line that starts with the hash or pound symbol (i.e., the symbol "#"). Comment lines may not be processed by the LPM. The content request 800 is for illustrative purposes only and is not intended to limit the disclosure in any way. Other ways of formulating content requests are also possible. The content request 800 may be transmitted to the LPM in response to, for example, a user selecting the user prompt "What should we try next?" from the query drop down list 714 of FIG. 7A.

The content request 800 can be considered to be a content request template since it does not include any specific information about any particular whiteboard, whiteboard template, or user query. Rather, the content request 800 includes variables (or placeholders) that the request generation tool 414 provides values for at the time of formulating content requests. The variables illustrated are {WB_GENERIC_CONTENT_DESCRIPTION}, {TEMPLATE_NAME}, {TEMPLATE_USE}, {TEMPLATE_GRAPHICAL_DESCRIPTION}, {EMPTY_TEMPLATE_GRAPHICS_CONTENT}, {WB_CONTENT}, {USER_PROMPT}, and {DESIRED_RESPONSE}.

A section 802 includes a set of instructions or information provided to the LPM indicating the content of structured document of a generic (e.g., any) whiteboard. The content of the section 802 is not specific to any whiteboard or any whiteboard template and can be provided by the request generation tool 414 itself. A value of the {WB_GENERIC_CONTENT_DESCRIPTION} can be as shown in a generic structure 804, which describes a JSON document that represents graphical elements on a whiteboard. Each element in the array contains properties such as size, location, color, text, and other relevant details, allowing the LPM to understand and generate content in the context of a whiteboard.

A section 806 includes instructions given to the LPM to understand and generate content based on a specific whiteboard template. This section is shown as including the placeholders {TEMPLATE_NAME}, {TEMPLATE_USE}, {TEMPLATE_GRAPHICAL_DESCRIPTION}, and {EMPTY_TEMPLATE_GRAPHICS_CONTENT}, which the request generation tool 414 obtains (e.g., retrieves), respectively, from the name 502, the semantic description 504, the description of the graphical content 508, and the graphical content 506 of FIG. 5A.

A section 808 includes instructions specific to a particular whiteboard. The section 808 provides a snapshot of the state of the whiteboard at the time that the content request is formulated, including both the whiteboard template and any user-generated content (e.g., graphical elements). The placeholder {WB_CONTENT} can be replaced by a structured document that describes the current content of the whiteboard. The structured document may be generated by or may be as described with respect to the whiteboard rendering tool 412 of FIG. 4.

A section 810 specifies a task or action that the LPM is to perform. The LPM response (e.g., completion) should result in a new structured (e.g., JSON) document that aligns with the indicated user query. In this case, the response is to fulfill the query without any further explanation so that, for example, the response can be rendered without further pre-processing to extract the structured document from the response. The placeholders {USER_PROMPT} and {DESIRED_RESPONSE} can be replaced, respectively, by the user prompt, which can be as described with respect to the user prompt 612A of FIG. 6, and the LPM-desired output, which can be the LPM-desired output 612B of FIG. 6.

Figure 9:
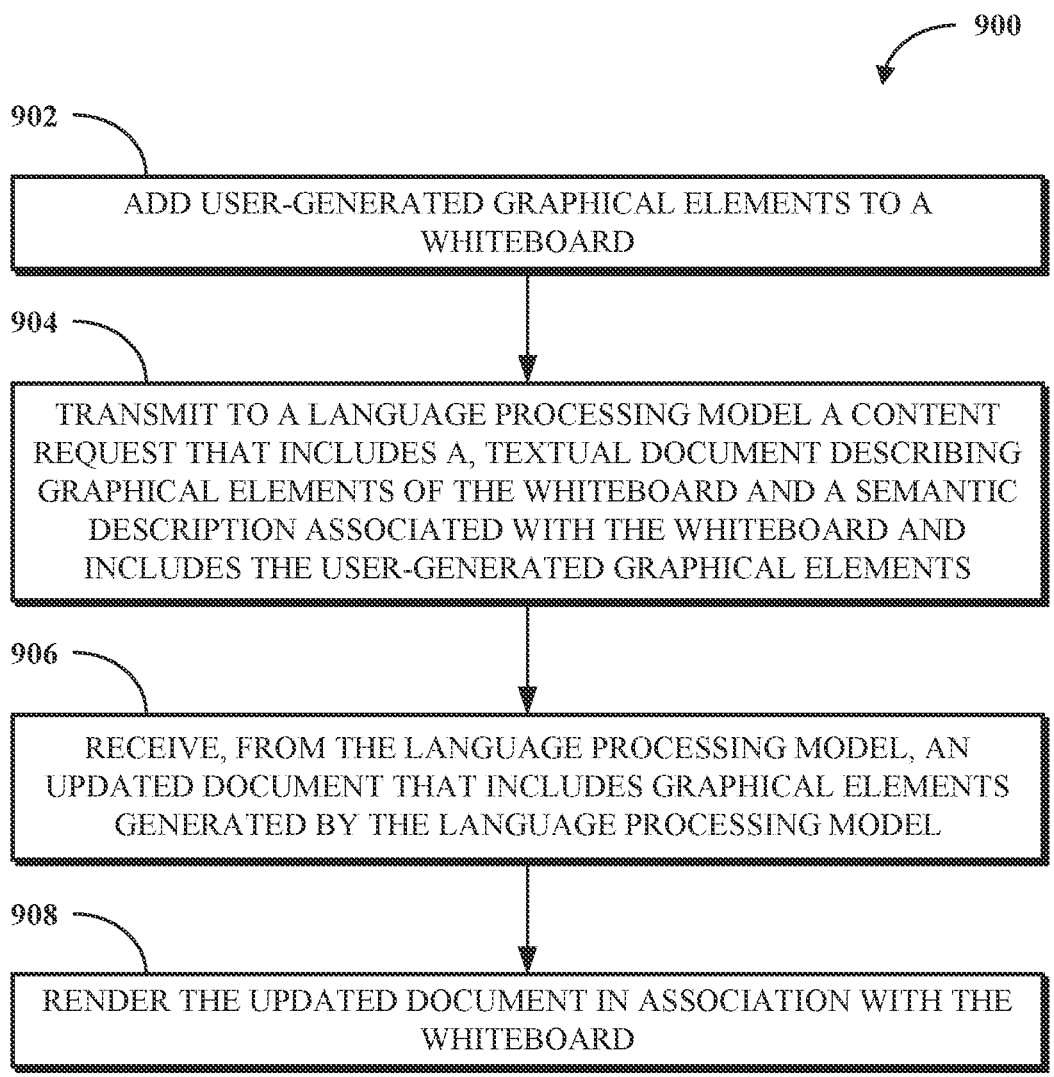
FIG. 9 is a flowchart of an example of a technique for generating whiteboard content using an LPM.

To further describe some implementations in greater detail, reference is next made to examples of techniques which may be performed by or using a system for generating whiteboard content using an LPM. FIG. 9 is a flowchart of an example of a technique 900 for generating whiteboard content using an LPM. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof. For example, the technique 900 can be performed in whole or in part by a whiteboard software, such as the whiteboard software 404 of FIG. 4.

For simplicity of explanation, the technique 900 is depicted and described herein as a series of steps or operations. However, the steps or operations of the technique 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, user-generated graphical elements are added to the whiteboard. The user-generated graphical elements may be added in response to user requests to add the user-generated graphical elements. For example, a user may be using whiteboard drawing tool to add the user-generated graphical elements to the whiteboard. The user may associate properties (e.g., rendering properties) with at least some of the user-generated graphical elements. For example, the user-generated graphical elements can include at least one of a shape or text and properties defining an appearance of the shape or text.

At 904, a content request is transmitted to an LPM. The content request includes a textual (e.g., structured) document that describes graphical elements of the whiteboard and a semantic description associated with the whiteboard. The graphical elements of the whiteboard include the user-generated graphical elements. In an example, the content request can be transmitted to the LPM in response to a user request, such as described with respect to FIG. 7A. In an example, one or more queries associated with the whiteboard can be presented in a user interface, such as described with respect to FIGS. 7A-7B; and the content request can be formulated for transmission to the LPM in response to a selection of one of the one or more queries. In another example, the content request can be formulated based on an open-ended query received from a user of the whiteboard.

The semantic description can be retrieved from a whiteboard template associated with the whiteboard. The content request can also include graphical structural information specifying an arrangement of graphical elements in a whiteboard template associated with the whiteboard. The graphical structural information can be as described with one or both of the {TEMPLATE_GRAPHICAL_DESCRIPTION} and {EMPTY_TEMPLATE_GRAPHICS_CONTENT} of FIG. 8. The semantic description associated with the whiteboard can include linguistic information describing an intended use of visual content within a whiteboard template associated with the whiteboard, which can be as described with respect to one or both of {TEMPLATE_NAME} or {TEMPLATE_USE} of FIG. 8.

At 906, an updated textual document that includes graphical elements generated by the language processing model is received from the LPM. The updated textual document can be as described with respect to FIG. 7B.

At 908, the updated textual document in rendered in association with the whiteboard. For example, the whiteboard can be re-rendered based on the updated textual document. In an example, at least one of the graphical elements generated by the language processing model may be highlighted on the whiteboard. In an example, the highlights can be applied in response to identifying differences in the textual document and the updated textual document. In another example, the LPM can be instructed to add annotations (e.g., highlights) to graphical elements that the LPM adds or modifies. As such, the highlighting can be based on the annotations added by the LPM.

The disclosure presented herein may be considered in view of the following clauses.

Example Clause A: A method, comprising: adding user-generated graphical elements to a whiteboard; transmitting, to a language processing model, a content request comprising a textual document describing graphical elements of the whiteboard and a semantic description associated with the whiteboard, wherein the graphical elements of the whiteboard include the user-generated graphical elements; receiving, from the language processing model, an updated textual document that includes graphical elements generated by the language processing model; and rendering the updated textual document in association with the whiteboard.

Example Clause B: The method of Example Clause A, wherein transmitting the content request to the language processing model comprises: retrieving the semantic description from a whiteboard template associated with the whiteboard for inclusion in the content request.

Example Clause C: The method of Example Clause A or Example Clause B, wherein the content request further comprises graphical structural information specifying an arrangement of graphical elements in a whiteboard template associated with the whiteboard.

Example Clause D: The method of any one of Example Clauses A-C, further comprising: presenting one or more queries associated with the whiteboard; and formulating the content request in response to a selection of one of the one or more queries.

Example Clause E: The method of any one of Example Clauses A-D, further comprising: receiving an open-ended query from a user of the whiteboard; and formulating the content request based on the open-ended query.

Example Clause F: The method of any one of Example Clauses A-E, wherein the semantic description associated with the whiteboard comprises linguistic information describing an intended use of visual content within a whiteboard template associated with the whiteboard.

Example Clause G: The method of any one of Example Clauses A-F, wherein rendering the updated textual document in association with the whiteboard comprises: highlighting, on the whiteboard, at least one of the graphical elements generated by the language processing model.

Example Clause H: The method of any one of Example Clauses A-G, wherein the updated textual document comprises an annotation to one of the user-generated graphical elements, and wherein rendering the updated textual document in association with the whiteboard comprises: highlighting the one of the user-generated graphical elements to indicate the annotation.

Example Clause I: The method of any one of Example Clauses A-H, wherein the user-generated graphical elements comprises at least one of a shape or text and properties defining an appearance of the shape or text.

Example Clause J: A system, comprising: one or more memories; and one or more processors, the one or more processors configured to execute instructions stored in the one or more memories to: add user-generated graphical elements to a whiteboard; transmit to a language processing model a content request comprising a textual document describing graphical elements of the whiteboard and a semantic description associated with the whiteboard, wherein the graphical elements of the whiteboard include the user-generated graphical elements; receive, from the language processing model, an updated textual document that includes graphical elements generated by the language processing model; and render the updated textual document in association with the whiteboard.

Example Clause K: The system of Example Clause J, wherein the semantic description is associated with a whiteboard template from which the whiteboard is instantiated.

Example Clause L: The system of Example Clause J or Example Clause K, wherein the semantic description associated with the whiteboard comprises linguistic information describing an intended use of the whiteboard.

Example Clause M: The system of any one of Example Clauses J-L, wherein the language processing model is cloud-based.

Example Clause N: The system of any one of Example Clauses J-M, wherein the language processing model is integrated into a whiteboard software.

Example Clause O: The system of any one of Example Clauses J-N, wherein the language processing model is further configured to analyze the graphical elements and the semantic description to generate suggested content modifications, and wherein the suggested content modifications are included in the updated textual document.

Example Clause P: A non-transitory computer readable medium storing instructions operable to cause one or more processors to perform operations comprising: adding user-generated graphical elements to a whiteboard; transmitting to a language processing model a content request comprising a textual document describing graphical elements of the whiteboard and a semantic description associated with the whiteboard, wherein the graphical elements of the whiteboard include the user-generated graphical elements; receiving, from the language processing model, an updated textual document that includes graphical elements generated by the language processing model; and rendering the updated textual document in association with the whiteboard.

Example Clause Q: The non-transitory computer readable medium of Example Clause P, wherein the operations further comprise: formulating the content request based on an open-ended query received from a user of the whiteboard.

Example Clause R: The non-transitory computer readable medium of Example Clause P or Example Clause Q, wherein the operations further comprise: formulating the content request in response to a selection of a user prompt selected from a set of user prompts.

Example Clause S: The non-transitory computer readable medium of any one of Example Clauses P-R, wherein the content request comprises instructions to the language processing model to highlight graphical elements added by the language processing model in the update textual document.

Example Clause T: The non-transitory computer readable medium of any one of Example Clauses P-S, wherein the instructions further comprise: receiving a command to accept one of graphical elements generated by the language processing model.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   adding user-generated graphical elements to a whiteboard;
   generating a textual document that describes graphical elements of the whiteboard, including the user-generated graphical elements;
   transmitting, to a language processing model, a content request comprising the textual document and a semantic description associated with the whiteboard;
   receiving, from the language processing model, an updated textual document that includes graphical elements generated by the language processing model; and
   rendering the updated textual document on the whiteboard.

2. The method of claim 1, wherein transmitting the content request to the language processing model comprises:
   retrieving the semantic description from a whiteboard template associated with the whiteboard for inclusion in the content request.

3. The method of claim 1, wherein the content request further comprises graphical structural information specifying an arrangement of graphical elements in a whiteboard template associated with the whiteboard.

4. The method of claim 1, further comprising:
   presenting one or more queries associated with the whiteboard; and
   formulating the content request in response to a selection of one of the one or more queries.

5. The method of claim 1, further comprising:
   receiving an open-ended query from a user of the whiteboard; and
   formulating the content request based on the open-ended query.

6. The method of claim 1, wherein the semantic description associated with the whiteboard comprises linguistic information describing an intended use of visual content within a whiteboard template associated with the whiteboard.

7. The method of claim 1, wherein rendering the updated textual document in association with the whiteboard comprises:
   highlighting, on the whiteboard, at least one of the graphical elements generated by the language processing model.

8. The method of claim 1,
   wherein the updated textual document comprises an annotation to one of the user-generated graphical elements, and
   wherein rendering the updated textual document in association with the whiteboard comprises:

highlighting the one of the user-generated graphical elements to indicate the annotation.

9. The method of claim 1, wherein the user-generated graphical elements comprises at least one of a shape or text and properties defining an appearance of the shape or text.

10. A system, comprising:
one or more memories; and
one or more processors, the one or more processors configured to execute instructions stored in the one or more memories to:
add user-generated graphical elements to a whiteboard;
generate a textual document that describes graphical elements of the whiteboard, including the user-generated graphical elements;
transmit to a language processing model a content request comprising the textual document and a semantic description associated with the whiteboard;
receive, from the language processing model, an updated textual document that includes graphical elements generated by the language processing model; and
render the updated textual document on the whiteboard.

11. The system of claim 10, wherein the semantic description is associated with a whiteboard template from which the whiteboard is instantiated.

12. The system of claim 10, wherein the semantic description associated with the whiteboard comprises linguistic information describing an intended use of the whiteboard.

13. The system of claim 10, wherein the language processing model is cloud-based.

14. The system of claim 10, wherein the language processing model is integrated into a whiteboard software.

15. The system of claim 10, wherein the language processing model is further configured to analyze the graphical elements and the semantic description to generate suggested content modifications, and wherein the suggested content modifications are included in the updated textual document.

16. A non-transitory computer readable medium storing instructions operable to cause one or more processors to perform operations comprising:
adding user-generated graphical elements to a whiteboard;
generating a textual document that describes graphical elements of the whiteboard, including the user-generated graphical elements;
transmitting to a language processing model a content request comprising the textual document and a semantic description associated with the whiteboard;
receiving, from the language processing model, an updated textual document that includes graphical elements generated by the language processing model; and
rendering the updated textual document on the whiteboard.

17. The non-transitory computer readable medium of claim 16, wherein the operations further comprise:
formulating the content request based on an open-ended query received from a user of the whiteboard.

18. The non-transitory computer readable medium of claim 16, wherein the operations further comprise:
formulating the content request in response to a selection of a user prompt selected from a set of user prompts.

19. The non-transitory computer readable medium of claim 16, wherein the content request comprises instructions to the language processing model to highlight graphical elements added by the language processing model in the update textual document.

20. The non-transitory computer readable medium of claim 16, wherein the instructions further comprise:
receiving a command to accept one of graphical elements generated by the language processing model.

* * * * *